April 4, 1950 A. JOHNSON 2,502,850
ANIMAL TRAP
Filed Aug. 14, 1947
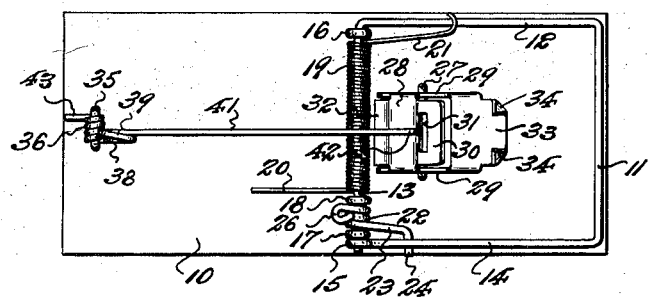
Fig. 1
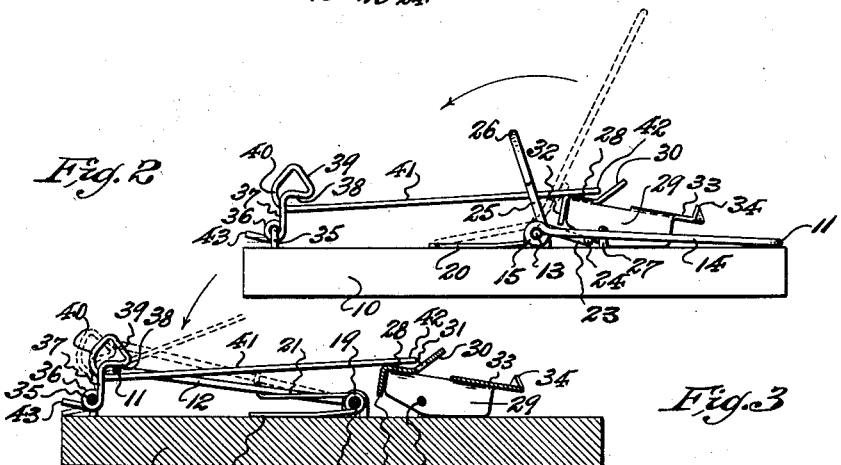
Fig. 2
Fig. 3
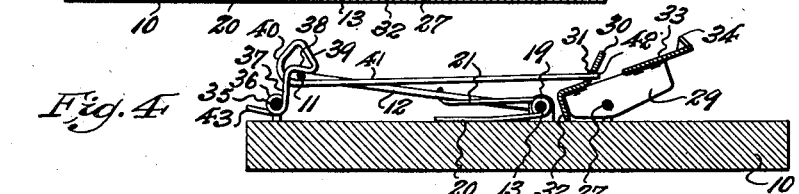
Fig. 4
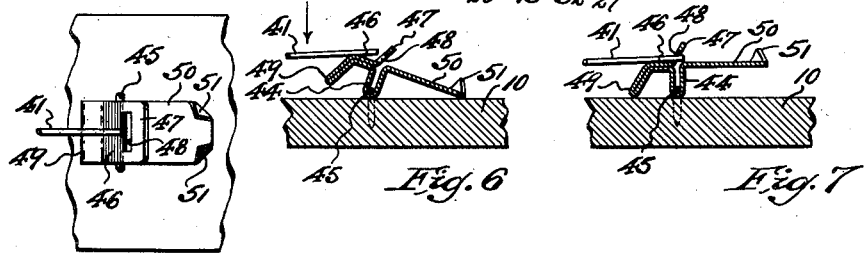
Fig. 5   Fig. 6   Fig. 7
INVENTOR.
Andrew Johnson,
BY
George D. Richards
Attorney Patented Apr. 4, 1950

2,502,850

UNITED STATES PATENT OFFICE 2,502,850

ANIMAL TRAP

Andrew Johnson, Butte, Mont.

Application August 14, 1947, Serial No. 768,558

2 Claims. (Cl. 43—81)

This invention relates to improvements in animal traps of the spring actuated pivoted trap or striker jaw type; and, more particularly, to traps of such type which are especially well adapted for use in trapping rats, mice and other small animals.

The invention has for an object to provide, in a trap of the character mentioned, a novel construction and relation of trigger means and cooperative detent member for holding the trap or striker jaw in open or set position under the constraint of its actuating spring; the arrangement being such that the operation of swinging back the trap or striker jaw to open or set position automatically engages the latter with the detent member so that it will be restrained thereby, while at the same time the interlocking of the detent member and trigger means in trap or striker jaw restraining relation is also automatically accomplished by pressing the trap or striker jaw down upon the detent member; all whereby the trap may be safely and easily handled during the operation of setting the same without risk of injury to the hands or fingers of the manipulator.

Other objects of this invention, not at this time more particularly enumerated, will be understood from the following detailed description of the same.

Illustrative embodiments of this invention are shown in the accompanying drawings, in which:

Fig. 1 is a plan view of the trap according to this invention in its sprung or closed condition; and Fig. 2 is a side elevational view of the same.

Fig. 3 is a longitudinal sectional view of the trap with the trap or striker jaw swung back into engagement with the detent bar, but before the interlocked engagement of the latter with the trigger means has been completed; and Fig. 4 is a similar view after the interlocked engagement of the detent bar with the trigger means has been completed, whereby to restrain the trap or striker jaw in open or set position.

Fig. 5 is a fragmentary plan view of a modified form of trigger means for the trap; Fig. 6 is a longitudinal sectional view of the same before interlocked engagement of the detent bar therewith has been completed; and Fig. 7 is a similar view of the same after interlocked engagement of the detent bar therewith has been completed.

Similar characters of reference are employed in the above described views, to indicate corresponding parts.

Referring to the drawings, the reference character 10 indicates the base of the trap, which preferably comprises a rectangular block of wood of suitable thickness, the forward end portion of which constitutes the stationary jaw of the trap. A wire loop formation of preferably rectangular conformation forms the movable striker jaw 11 of the trap. One side member 12 of the striker jaw 11 terminates at its inner end in a right angular or transverse extension adapted to provide the pivoting member 13 about the axis of which the striker jaw swings toward and from the trap base 10. The other side member 14 of the striker jaw 11 terminates at its inner end in an eye member 15 which embraces the free end of said pivoting member 13. As thus constituted, the striker jaw 11 comprises a unitary or one-piece structure adapted to be produced from a single length of wire of suitable gauge.

The pivoting member 13 of the striker jaw 11 is journaled in bearings so as to be pivotally connected with said trap base 10 at a point intermediate the ends of the latter. Said bearings are formed by staples 16 and 17 which respectively embrace the respective end portions of said pivoting member 13, said staples being driven into and so as to upstand from the trap base 10.

A third staple 18 is also similarly affixed to the trap base and around the pivoting member 13 of the striker jaw 11 so as to be disposed in inwardly spaced relation to one of the aforesaid staples, as e. g. the staple 17, whereby to provide, intermediate the latter and said staple 18, a section of the pivoting member 13 which is adapted to serve as a fulcrum means for a bell-crank lever member, to be subsequently described, which is manipulatable in cooperation with the striker jaw 11, whereby to upswing the latter from closed or trapping position relative to the trap base 10.

A helical torsion spring 19 is engaged around the pivoting member 13 of the striker jaw 11 between the staples 16 and 18. One end or terminal arm 20 of said spring 19 bears upon the trap base 10, while the other end or terminal arm 21 of said spring is hooked over and onto the side member 12 of the striker jaw 11, so that the tension of the spring yieldably urges the striker jaw to forwardly and down swung trapping position relative to the trap base 10.

The heretofore mentioned bell-crank lever member also comprises a wire formation shaped to provide a plurality of helical convolutions adapted to furnish a hinge member 22 of appreciable length which is mounted on the pivoting member 13 to extend between the bearing staples 17 and 18. The outer end of said hinge member 22 terminates in a forwardly extending lever arm 23 which, in turn, terminates in a lift tongue 24 adapted to engage beneath the side member 14 of the striker jaw 11. The inner end of said hinge member 22 terminates in an upstanding lever arm 25, the free end of which is bent or doubled back upon itself to provide a finger-piece 26 by means of which the bell-crank lever member may be manipulated.

Pivotally mounted on the trap base 10, by suitable means such e. g. as the transverse bearing staple 27, so as to be disposed forwardly of but adjacent to the pivoted connection of the striker jaw with said base 10, and so as to lie within the confines of the striker jaw when the same is closed, is a combined trigger and bait pan. In one form thereof as shown in Figs. 1 to 4 inclusive, said combined trigger and bait pan comprises a horizontal body portion 28 having side portions 29 dependent from its lateral margins, through which side portions the transverse bearing staple 27 extends, whereby to mount the body portion for longitudinal rocking movements about said supporting bearing staple. Struck out from the medial part of the body portion 28 is an upwardly and outwardly inclined or oblique trigger tongue 30. Said trigger tongue 30 is provided, adjacent to its base, with a detent bar receiving opening or slot 31. The body portion 28 preferably terminates at its inner end in a dependent end wall 32, which may serve as a stop for limiting the down tilting movement of the inner end of said body portion. The outer part 33 of said body portion 28 provides a bait supporting pan, which is preferably provided with one or more upstanding spurs 34 for securing the bait in affixed relation thereto.

Pivotally mounted on the rearward end portion of the trap base 10, by suitable means such e. g. as the transverse bearing staple 35, is a detent member. Said detent member, in the preferred form thereof as shown, comprises a wire formation shaped to provide a plurality of helical convolutions adapted to furnish a hinge member 36 of appreciable length which is mounted on the transverse bearing staple 35. Extending from one end of the hinge member 36 is a substantially perpendicular or upstanding offsetting arm 37 which terminates in a forwardly extending latch element 38. Extending from the forward end of said latch element 38 is an upwardly and rearwardly inclined or oblique cam nosing 39, which in turn terminates in a dependent elbow portion 40 from which extends, forwardly and beneath the latch element 38 in suitably downwardly spaced relation thereto, a detent bar 41. Said detent bar is of such length that its free end portion extends to and overlies the inner end portion of the combined trigger and bait pan, with its free extremity adjacently juxtaposed relative to the trigger tongue 30 of the latter. Extending rearwardly from the opposite end of the hinge member 36 is a stop arm 43 adapted, at proper times, to engage the trap base 10 so as to limit upswinging movement of the detent bar 41.

If the trap has been sprung by an animal, so that the latter is struck by the striker jaw 11 and caught between the same and the trap base, the animal may be quickly and easily released from the trap without necessity for touching it. This may be done by swinging down the lever arm 25 of the bell-crank lever member which operates to upswing the lever arm 23 and its lift tongue 24, whereby, in turn, to upswing the striker jaw 11 to animal releasing position, as shown by the broken line representation of the latter in Fig. 2.

To reset the trap, the striker jaw 11 is raised by means of the bell-crank lever member in the manner above described, and when thus raised is grasped by the fingers and swung back and down in the direction of the arrow shown in Fig. 2. As thus swung back and down, the striker jaw 11 is pressed down toward the detent member, whereby to first engage the cam nosing 39 so as to ride thereover, thus causing the detent bar 41 to swing upward so that the striker jaw 11 may pass under the latch element 38 as the detent bar drops back to downswung normal position. By this operation the striker jaw 11 is engaged beneath the latch element 38 and between the latter and the detent bar 41 (see Fig. 3). After this takes place, by exercise of continued downward pressure upon the striker jaw 11, downward pressure is transmitted thereby to the detent bar 41, so as to cause forceful down thrust of the free end portion of the latter upon the inner end portion of the combined trigger and bait pan. The thrust thus exercised upon the trigger means effects a downward tilting or rocking of its inner end portion, whereby to swing rearwardly the trigger tongue 30 so as to enter the extremity 42 of the detent bar 41 through its opening or slot 31, thus operatively interengaging the trigger tongue and detent bar so as to restrain the latter from upswinging striker jaw releasing movement under the urge of striker jaw actuating spring 19 (see Fig. 4).

It will be noted that the above described trap setting operations are automatically effected merely by swinging the striker jaw 11 back and down upon the detent member, so that it is not necessary for the manipulator to touch the trigger means, or bring the hands or fingers within the path of the forward spring actuated downswinging movement of the striker jaw. As a consequence of this, risk of injury to the hands or fingers of the manipulator is avoided, so that the operations of setting the trap are not only easily but safely accomplished.

It will be obvious that, due to the novel construction of the detent member as provided with the striker jaw latching means above the detent bar, it is not necessary for the latter to be swung over the striker jaw as in previous traps of the general type here involved, which necessity involved the further necessity for manual manipulation of trigger mechanism with all attendant risk of accidental injury to hands or fingers. Furthermore, by reason of the novel construction of detent member according to this invention, the detent bar 41 may be limited to a relatively small amplitude of upswing movement, and as provided with a pivoting hinge structure of appreciable length, the detent bar is substantially free from lateral swinging movement, and consequently is self-maintained in operative relation to the trigger means at all times.

The structural features of the detent member and the trigger means, together with the disposition of the free end of said detent member in overlying relation to the inner end portion of said trigger means, all cooperate to insure unfailing automatic setting of the trap under all conditions of practical use whenever the striker jaw is opened and pressed rearwardly and downwardly against the detent member. In normal use, the trap is handled in awkward situations in deep recesses of cupboards, under and behind articles of furniture, and usually down low on the floor, where visibility may be poor. This particular trap can be re-set in such locations without removal and in a moment of time, because the latching means will function automatically regardless of the angular disposition of the base when being handled. It makes no difference whether the base is held level or is tilted forward, backward or sideways, or even upside down. Depending upon the direction of tilt, the trigger means will assume either one of two extreme positions relative to the base, e. g. the forwardly tilted position of Fig. 3 or the rearwardly tilted position of Fig. 4. Nevertheless, depression of detent bar 41 by setting operation of striker jaw 11 cannot fail to cause engagement of the free end of said bar in slot 31 of tongue 30 in either case. In the forwardly tilted position (Fig. 3), slot 31 will be beyond the reach of the free end of bar 41, but downward pressure of the latter on the inner end portion of the trigger means will cause said means to tilt rearwardly downward and thus bring slot 31 into engagement with the said bar end. On the other hand, in the rearwardly tilted position of Fig. 4 (as might be the case if the base was disposed upside down), the bar end will be opposed to the inclined upper face of trigger tongue 30 at a point forward or outward of slot 31. The bar end will thus be over-reaching the slot. Downward pressure of detent bar 41, under these conditions, will cause cam action between the free end of the bar and the inclined trigger tongue face, with the result that the trigger means will be rocked to the degree necessary to permit the bar end to slip into slot 31, wherein the engaged position of Fig. 4 is effected.

There is still a third condition which may occur that might be an obstruction to automatic setting of the striker jaw were it not for the specific formation of the detent bar in prolongation of the depending elbow portion 40. That is the condition in which the free end of detent bar 41 has become accidentally engaged in slot 31 of the trigger means while the striker jaw 11 is in sprung or closed position (Figs. 1 and 2). Due to the wire formation just mentioned, there will be sufficient resiliency to permit rearward deflection of latch element 38 when striker jaw 11 is pressed downward against cam nosing 39, as shown in dotted lines in Fig. 3. The free end of detent bar 41, in this situation, will retain its engagement with trigger slot 31 instead of being upswung into the dotted line position of Fig. 3.

Due to the elongated coil formation of hinge member 36, the detent bar 41 is held steady against lateral swinging movement on its pivotal axis which otherwise might prevent proper registration of the free end of said bar with trigger slot 31 when the trap as a whole happens to be tilted sideways in the act of resetting striker jaw 11.

When the trap of this invention is baited and set, if an animal attempts to obtain the bait such attempt results in down tilting or rocking of the bait pan end of the trigger means with consequent up tilting or rocking of the inner end of the latter, so that the trigger tongue 30 is outswung away from the extremity 42 of the detent bar 41, and said detent bar is thus released from the restraint thereof. When this occurs, the latch means 38 will be free to yield to the spring urged movement of the striker jaw 11, so that the latter will instantly swing forward and down to closed position, whereby to strike the animal and grip the same between the striker jaw and trap base 10.

In Figs. 5 to 7 inclusive there is shown a modified form of combined trigger and bait pan which nevertheless embodies the principles of the instant invention. This modified form of trigger and bait pan can be produced from a strip of sheet metal of suitable length and width. The metallic strip is folded upon itself to provide, intermediate its ends, a dependent U-shaped pivoting member 44 journaled for longitudinal rocking movement on a transverse bearing staple 45. The forward end of the strip is doubled back upon itself to provide the inner end portion 46 of the trigger structure, the free end of the doubled back part being upwardly and outwardly inclined to form the oblique trigger tongue 47 having a detent bar receiving opening or slot 48. Said inner end portion 46, as thus formed, may and preferably does have its free end part downwardly bent and directed to provide a stop portion 49 for limiting the down tilting or rocking movement of said inner end portion 46. The outer end portion 50 of the strip provides a bait pan, and is provided with one or more upstanding spurs 51 for securing the bait in affixed relation thereto. It will be obvious, from an inspection of Figs. 5 to 7 inclusive, that the mode of operation of the aforesaid modified construction of combined trigger and bait pan in cooperation with a detent bar 41 is the same as already above set forth with respect to the first described construction of trigger and bait pan means.

Having now described my invention, I claim:

1. A trap having a base, a striker jaw pivotally mounted on said base to cooperate with the latter for seizing an animal therebetween, spring means to forcibly close said striker jar on the base, bait holding trigger means pivotally mounted on the base subject to longitudinal rocking movement, said trigger means having a perforate trigger tongue adjacent its inner end portion, a vertically swingable detent bar pivotally mounted on the rear end portion of the base to extend toward and with its free end portion disposed to overlie the inner end portion of the trigger means and adapted to contact the same, said detent bar having latch means upwardly offset therefrom adjacent its pivoted end, said latch means being adapted to engage over and hold the striker jaw when the latter is swung back to set open position, said detent bar being adapted to be downswung by movement of the striker jaw into latched relation thereto, whereby the free end portion of the detent bar exerts down tilting pressure upon the inner end portion of the trigger means effective to automatically move the perforate trigger tongue into holding engagement with the extremity of the detent bar, the detent bar and its latch means comprising a wire formation having a hinge member of substantial length whereby lateral swinging movement of the detent bar is prevented, an upstanding arm extending from the hinge member, a latch element extending from said arm in substantially spaced relation to and above the detent bar, said latch element terminating in a rearwardly inclined cam nosing, and an elbow portion dependent from the cam nosing, from which elbow portion the detent bar extends, said elbow portion affording sufficient resiliency to permit rearward deflection of the latch means whenever the free end of the detent bar is engaged in the perforation of the trigger tongue.

2. A trap having a base, a striker jaw pivotally mounted on said base to cooperate with an end portion of the latter for seizing an animal therebetween, spring means to forcibly close the striker jaw on the base end portion, trigger means pivotally mounted on the base within the area of the closed position of the striker jaw subject to longitudinal rocking movement, the trigger means having an upwardly and forwardly inclined perforate trigger tongue adjacent its inner end portion, said trigger means having a bait supporting means at its outer end portion, a vertically swingable detent bar pivotally mounted on the rear end portion of the base to extend toward and with its free end portion disposed to overlie the inner end of the trigger means and adapted to directly contact the same or said inclined trigger tongue, as the case may be, said detent bar having latch means upwardly offset therefrom adjacent its pivoted end, said latch means being adapted to engage over and hold the striker jaw when the latter is swung back to set open position, the detent bar being adapted to be downswung by movement of the striker jaw into latched relation thereto, whereby the free end portion of the detent bar exerts down tilting pressure upon the inner end portion of the trigger means effective to automatically move the perforate trigger tongue into holding engagement with the extremity of the detent bar, the detent bar and its latch means comprising a wire formation having a hinge member of substantial length whereby lateral swinging movement of the detent bar is prevented, an upstanding arm extending from the hinge member, a latch element extending from said arm in substantially spaced relation to and above the detent bar, said latch element terminating in a rearwardly inclined cam nosing, and an elbow portion dependent from the cam nosing, from which elbow portion the detent bar extends, said elbow portion affording sufficient resiliency to permit rearward deflection of the latch means whenever the free end of the detent bar is engaged in the perforation of the trigger tongue.

ANDREW JOHNSON.

REFERENCES CITED

The following references are of record in the file of this patent:

UNITED STATES PATENTS

| Number | Name | Date |
|---|---|---|
| 1,164,916 | Brown | Dec. 21, 1915 |
| 1,248,944 | Stilson | Dec. 4, 1917 |
| 1,541,856 | Sands | June 16, 1925 |
| 2,215,028 | Booth | Sept. 17, 1940 |
| 2,376,591 | Hammond | May 22, 1945 |

FOREIGN PATENTS

| Number | Country | Date |
|---|---|---|
| 381,280 | Great Britain | Oct. 6, 1932 |